UNITED STATES PATENT OFFICE 2,530,210

PRODUCTION OF ENZYMES IN SUBMERGED CULTURES OF BACTERIA

Carl V. Smythe, Moorestown, N. J., and Billy Blandin Drake and Clifford E. Neubeck, Philadelphia, Pa., assignors to Rohm & Haas Company, Philadelphia, Pa., a corporation of Delaware No Drawing. Application January 23, 1947,
Serial No. 723,888

7 Claims. (Cl. 195—96)

This invention deals with a method for preparing enzymes by the submerged or deep culture of aerobic bacteria. More particularly, it relates to an improved process for preparing proteolytic and diastatic enzymes by growing aerobic bacteria in liquid media in tanks or vats, said media being supplied with gaseous oxygen and containing starch, protein, and suspended particles of broken cereal grains.

Enzymes are known to be produced during the growth of some bacteria on culture media. In the usual processes, bacteria have been grown on surfaces of liquid media or moist solid nutrients in relatively thin layers. This process requires considerable space and time for even modest production. It has been proposed from time to time to attempt the production of enzymes by submerged culture in vats or tanks. While bacteria have been thus grown in deep layers of nutrient materials, the yield of enzymes has been low, the rate of growth has been slow, and the over-all results have not met expectations.

Whether the disappointing results have been due to changes in metabolism of bacteria under conditions of submerged culture or whether the conditions of culture promoted consumption or decomposition of enzymes, if formed, the submerged culture techniques previously known have failed to provide the degree of enzyme activity actually obtained in shallow layer culture from a given quantity of nutrient material. Prolonging the period of growth has only added to the inefficiency of previous tank cultures, while increasing the concentration of the solution used in the submerged technique has neither accelerated the rate of production nor increased the enzymatic activity of the digested culture. There may be added that submerged culture as previously attempted has given inexplicable variations in results which precluded such method from practical industrial applications.

A method has now been discovered which provides economies in apparatus, space, labor, and time, which results in excellent yields of enzymes from a given amount of nutrient materials, and which consistently produces diastase and protease at a high level of activity. This method comprises growing with aseptic technique at temperatures of 30° to 40° C. with a pH level between six and nine selected strains of *Bacillus mesentericus* and *Bacillus subtilis*, having a good rate of production of diastase and protease, in an aqueous medium containing starch and protein and having dispersed therein discrete particles of a broken cereal grain, supplying gaseous oxygen at a rate at least twice as great as the rate of consumption of oxygen as shown by evolvement of carbon dioxide, sweeping out this carbon dioxide by supplying an excess of an inert gas, such as nitrogen, or of air, or of gaseous oxygen, and agitating the aqueous culture medium to maintain practically uniform conditions throughout said medium.

The culture medium is prepared by suspending, dispersing, or dissolving a starch or solubilized starch in water in an amount of two parts to fourteen parts for one hundred parts of water, mixing therewith one part to five parts of protein, and adding five parts to fifteen parts of broken cereal grain in the form of discrete particles.

If the starch has not already been solubilized, it is gelatinized and solubilized in the liquid medium being prepared. For this purpose, a small amount of a liquefying enzyme may be added and the mixture heated until starch has been converted. The mixture is then heated to a somewhat higher temperature to inactivate the enzyme and ensure sterility of the mixture. If a soluble starch is used, the mixture is nevertheless heated to prevent contamination with any organism which might be present. The starch used may be from root or grain, and includes cassava, potato, wheat, or corn starch.

As proteinaceous material, there is used a protein such as zein, prosein, or casein, or a substance supplying available protein such as soya bean meal or flour, cotton seed meal, corn steep liquor, and the like. These materials seem to supply not only nitrogen compounds but also growth factors, which could, if desired, be separately added. The proteinaceous materials also may be supplemented with small amounts of ammonium salts, such as ammonium sulfate or ammonium phosphate. Mixtures of two or more nitrogenous materials may be used.

As cracked cereal grain, there may be used corn meal, hominy, oat meal, rye meal, broken rice, or other cracked or broken cereal grain. Crushed wheat meal or farina may be used but, because of the peculiar behavior or properties of wheat meals, is not so effective as meals from other grains.

The particle size of the broken cereal grain may vary from twenty to eighty mesh as to the principal portion but may contain some finer and some coarser material. In crushing the grain, it is desirable to strive to obtain as much material at about a sixty-mesh size as possible, since this size has been observed to give optimum results.

At least 4.6% of the total weight of the nutrient medium should be present in the form of discrete particles of cereal grain. About 8% to 12% appears to be optimum. The upper limit is determined only by the difficulties of passing gas into, through, and out of the nutrient medium and thoroughly agitating it to maintain uniform conditions throughout. The upper limit will depend upon the particular cracked grain or grains used and upon the particle sizes thereof. With a fair percentage of relatively coarse particles of a hard meal, the amount of the cracked material can obviously be higher than with finer material, particularly when of a gelatinous nature in the bath. Hence, while 15% is a practical upper limit, on the average, there are instances when somewhat more cracked grain can be used.

After the culture medium of starch, protein, and discrete particles of broken cereal grain has been prepared, it is advisable to determine the pH value thereof. If, for any reason, it is below a pH of six, a small amount of alkali, such as sodium hydroxide in solution or sodium carbonate, may be added to bring the pH to a level of six or more. Calcium carbonate may be added to help maintain the pH in the proper range, excess of this material not being harmful.

The culture medium as thus prepared is inoculated with a culture of the selected strain of *Bacillus mesentericus* or *Bacillus subtilis*. This culture may be grown on one of the usual bacteriological media which are commonly used. Alternatively, the culture may be taken from other vigorously growing batches of these bacteria in the deep culture media described above. In either case, care is taken to avoid contamination by foreign organisms. The inoculated medium is then maintained at incubating temperature while gaseous oxygen is supplied in amounts sufficient to promote growth and at the same time to sweep out carbon dioxide while the whole medium is thoroughly agitated.

The temperature at which enzyme production according to this invention can be undertaken varies from about 30° to over 40° C. The range of 35° to 38° C. has been generally found to be the most favorable one in which to operate. Optimum temperatures vary slightly with choice of bacteria and exact composition of the culture medium, but in every case will fall within the broad range. At 30° C. bacterial growth is slow, yet enzymes are produced. Growth is satisfactory at 40°, but, at two to three degrees above this point, production of enzymes is definitely checked.

It is generally necessary to control the temperature of tank cultures, as the heat of conversion of carbohydrate to carbon dioxide is considerable. This may be accomplished through the use of cooling coils or jackets. Cooling along with good stirring effectively maintains the culture medium at favorable temperatures for the growth of bacteria and the production of enzymes.

The questions of supply of oxygen and agitation are closely related, because, even if a large excess of oxygen is supplied to the culture, it must be distributed to all parts thereof continuously as oxygen is required and used. Furthermore, excess of gas is necessary to help carry off carbon dioxide from all parts of the culture and, with the aid of mechanical agitation, to maintain the culture throughout in as uniform as possible a state as to distribution of oxygen, carbon dioxide, starch, protein, broken cereal grain, and even the enzymes produced.

It has been found from a long series of experiments that at least twice the minimum need of oxygen for maintaining proper metabolism should be supplied. The oxygen may be used as a pure gas or it may be obtained from air. The gas is, of course, rendered free of contaminating organisms, as by proper scrubbing and filtering. These gases are preferably supplied and used under pressure, as this permits the best handling of the culture and good absorption of the oxygen by the liquid.

It has been observed that satisfactory enzyme production results when 0.0019 or more grams of oxygen is supplied per hour per cubic centimeter of medium, other conditions being satisfactorily adjusted. Somewhat more oxygen is to be preferred, particularly if the oxygen is supplied as a pure gas. The upper limit is fixed only by difficulties of manipulation, which include foaming and frothing. It has been found that ninety cubic feet of air (N. T. P.) per hour will maintain good growth in one hundred gallons of culture medium. The growth is somewhat better with a rate of 180 cubic feet of air per hour. Further increase in the amount of air does not extend the growth, providing, of course, that distribution of gas is adequate. This requires good, continuous agitation. In large vessels, this can be secured through mechanical stirring. Good distribution and utilization of oxygen is also favored by operating under pressure. Efficiency improves somewhat as the pressure is increased from five pounds (gauge) to twenty-five pounds. Higher pressures do not seem to add further to efficient production of enzymes under the conditions here described, essentially the same results being obtained at forty or fifty pounds of pressure as at twenty-five pounds.

In the method of this invention, there are used selected strains of *Bacillus subtilis* or *Bacillus mesentericus*. These strains are selected to give as favorable yields as possible of protease and diastase. There are strains of these bacteria which are but poorly effective for enzyme production, even though morphologically they are alike.

The isolation, selection, and identification of the suitable strains of bacteria may be done according to known principles. One convenient method of selection is described in Biochem. Bull. 4, 30 (1915). Briefly, in this method of selection, specimens of these bacteria are cultured on bacteriological media and colonies transferred to starch agar media at incubating temperatures. The rate of liquefaction of the starch immediately surrounding the colonies is observed and thereby the culture providing most rapid conversion is determined and selected.

The inoculum may be especially prepare, or it may be merely a portion from a batch of nutrient medium being used for the development of enzymes. In either case, it is best to take a culture during the stage of vigorous growth, that is, after ten to thirty hours of growth. The amount of inoculum used is not critical, a thousand-fold variation in quantity not causing more than a few hours' difference in reaching the maximum enzymatic activities. For pratical purposes, one part of inoculum—a vigorously growing culture of selected microorganisms in a nutrient medium—may be used for one hundred to eight hundred parts of the starch, protein, and broken grain medium.

In the early stages of growth of the selected strain in the starch solution containing protein and broken grain, the effluent gases constantly increase in percentage of carbon dioxide. In a short time, protease begins to develop and rapidly increases in amount. Diastase soon also begins to develop, but at first at a less rapid rate than the protease. In ten to thirty hours, the amount of protease reaches a maximum and thereafter the proteolytic activity may fall off. As it does so, the percentage of carbon dioxide in the effluent gases also tends to decrease, while the pH gradually rises. If the pH of the original medium was six and one half to seven, it usually happens that after the protease has reached a high level, the pH rises above a value of seven and continues to rise quite slowly as the concentration of diastase increases. The diastase reaches a high level of activity in thirty to sixty hours. It is obvious that if the main product desired is a protease, the culture should be harvested in the relatively earlier stages of growth. For optimum yield of protease, the pH should be below seven. If a diastase is the desired product, the growth in the culture medium should be continued. On the average, an optimum yield of diastase can be obtained after about forty-five to fifty hours of growth at 35° to 40° C., a somewhat longer time being needed for lower temperatures. The optimum yields of diastase are obtained when the pH of the medium is seven and one-half to eight and one-half.

Harvesting of the enzymes produced by the methods described may be effected through the use of adsorption materials or through precipitation and isolation of the active principles. On the other hand, the culture media may be used directly or after separation of solid material therefrom. According to the adsorption method, carries such as clay, silica gel, wood flours, or mixtures of such materials may be added to the culture medium after development of a desired level of enzymatic activity. Water may then be separated or evaporated under reduced pressure. Precipitation or enzymes may be effected by the addition of salts and/or an organic solvent which is miscible with water, such as methyl, ethyl, or propyl alcohols, acetone, or dioxane. The precipitate is collected and dried at relatively low temperatures.

The protease prepared as herein disclosed is characterized by a remarkable capacity for liquefying gelation rapidly. Casein can be completely solubilized therewith in twenty-four to twenty-eight hours, yet without the production of any appreciable amounts of aminoacids or the liberation of much amino nitrogen. It is evident that peptones are formed. By the combined use of protease prepared as described above and protease obtained by the growth of the protease-producing fungi on nutrient media, proteins can be hydrolyzed readily to aminoacids. The protease prepared by this invention when isolated or concentrated is a stable product. It can be protected by the use of calcium salts. The protease of this invention finds use in the removal of gelatin sizes on rayon, the bating of hides and skins, the preparation of food products, etc.

The diastase produced by this invention is characterized by its capacity for rapidly liquefying starch yet without saccharifying the hydrolysis products. It is apparently effective in producing dextrins and the like without producing sugars. It is very stable upon storage, particularly in the presence of calcium salts. In the presence of a substrate, it is stable against heat up to temperatures of 85° to 90° C. In view of its rapidity of action and stability, the diastase described can be advantageously and effectively used in the desizing of starched textiles, in the manufacture of sizes for paper, in the preparation of adhesives, etc.

Typical preparation of enzymes according to the method above described will now be presented as examples of effective ways of carrying out this invention.

Example 1

A sixty-gallon kettle of stainless steel was charged with forty gallons of water, thirteen pounds of corn starch, twenty-one pounds of corn steep liquor, and thirty-two pounds of hominy and the mixture rendered about neutral by the addition of a little caustic soda solution. Thereupon, three-quarters of a pound of a commercial liquefying diastase was added and the mixture was well stirred and heated. The starch was thus partially solubilized. The temperature was carried to over 100° C. to inactivate the liquefying enzyme used and render the mixture free of microorganisms. There were then added about three pounds of a sterile 1% solution of cetyl alcohol is castor oil (to control foaming). The mixture was cooled to 35° C. and a quart of an inoculum containing Bacillus subtilis was added. Air was filtered and passed into the mixture at the rate of forty-five cubic feet (N. T. P.) per hour, and the kettle was maintained at twenty-five pounds' pressure. By the use of cooling water in the jacket of the kettle, the temperature of the inoculated mixture was held between 35° and 38° C. The mixture was well and vigorously stirred. Samples were taken from time to time. After twenty-four hours, the proteolytic activity of the medium had reached a high state of protein-splitting activity as measured by the liquefaction of glue. After fifty-two hours, the medium had reached a very high starch-splitting activity as measured by the liquefaction of starch solutions.

To determine the proteolytic activity of the culture medium, a sample of the medium may be taken after growth has occurred and added to a solution of glue or gelatin. To permit comparisons, it is, of course, necessary that the conditions for liquefaction be fixed. Thus, it has been found desirable to fix the concentration of a high-grade animal glue at 30%, the temperature of liquefaction at 50° C., and the time for the test or evaluation at thirty minutes. It is also essential to fix the end point, which here has been taken as the viscosity equal to that of a solution of glycerine having a specific gravity of 1.218 at 25° C. The measure of activity may then be defined as the number of units of glue which are hydrolyzed by one unit of the enzyme preparation when a 30% glue solution is liquefied by this preparation at 50° C. in thirty minutes to give a solution having the same viscosity as that of a glycerine solution of 1.218 specific gravity at 25° C.

In the above example, one part of the medium taken at the end of twenty-four hours was found to be able to liquefy 1160 parts of glue under the prescribed conditions.

The diastatic activity may be similarly determined and compared. Thus, the number of units of a starch liquefied under set conditions by one unit of the diastatic material may be taken as the measure of diastatic activity. For the purpose of this invention, the conditions have been fixed as to temperature of conversion at 70° C. and as to time at ten minutes while the substrate is tapioca starch.

The end point is defined as the condition reached when a 12.5% starch solution reaches a viscosity the same as that of a glycerine solution having a specific gravity of 1.218 at 25° C.

Under these prescribed conditions, it was found that one part of the above-prepared culture medium was able to liquefy 8690 parts of starch.

Example 2

A mixture was prepared from four parts of tapioca starch, three parts of prosein, and ten parts of hominy in one hundred parts of water. About one tenth part of a commercial liquefying diastase was added, and the mixture was slowly heated through the gelatinous state. After the starch was partially solubilized, the mixture was heated to over 100° C. and then rapidly cooled to below 40° C. Two parts of a culture of Bacillus mesentericus from a previous batch were added with aseptic precautions. Air at fifteen pounds' pressure (gauge) was passed into the vessel at the rate of 0.0133 gram of air per cubic centimeter of liquid. The solution was thoroughly stirred. As some froth formed, a small amount of a solution of cetyl alcohol in castor oil was added from time to time. Samples of liquid were taken from time to time. After twenty-eight hours, it was found that one part of the culture medium liquefied 1160 parts of glue under the prescribed conditions. After fifty-two hours, one unit of the sample liquefied 9900 units of starch under the prescribed conditions.

Example 3

A culture medium was prepared by the method shown above, using 3.25 parts of cotton seed meal (41% protein), 4.0 parts of starch, 1.0 part of zein, 10.0 parts of hominy, and 100 parts of water. The mixture was inoculated with two parts of a culture of an active strain of Bacillus mesentericus and incubated at about 35° C. Oxygen was passed into the mixture at about four pounds' pressure and at the rate of 1.73 parts by volume (N. T. P.) per part of the liquid per hour. At the end of seventy-two hours, it was found that one part of culture medium liquefied 8235 parts of starch under the prescribed conditions.

It is interesting to note that similar preparations in which the hominy is not used develop only about one-half of the diastatic activity shown above.

Example 4

A mixture was prepared from four parts of corn starch, six and one-half parts of corn steep liquor (50% solids), one part of zein, ten parts of hominy, and one hundred parts of water. The starch was solubilized with a non-saccharifying diastase, the mixture was sterilized at fifteen pounds' pressure, and the mixture was cooled below 40° C. Inoculum as in Example 3 was added and air at atmospheric pressure passed through the culture medium at the rate of 13.5 volumes per volume of medium per hour. Cooling was supplied through water circulated in the jacket of the vessel containing the culture medium and the temperature thus held at about 38° C. From time to time, a dilute solution of octadecanol in rape seed oil was injected to control foaming. At the end of forty-eight hours, the sample taken showed that one part of the medium would liquefy 12,370 parts of starch.

Thereupon, about a quarter part of toluene was added along with five parts of diatomaceous earth. The culture medium was then filtered. About four parts of alcohol were added for each part of clear filtrate. A precipitate formed which was separated. This product, dried at 40° C., was found stable on storage at room temperature over many months. About 91% of the enzyme activity of the culture medium was retained in the final product.

Example 5

There was prepared in a 1200-gallon kettle a mixture of 6400 pounds of water, 640 pounds of hominy, 256 pounds of starch, 192 pounds of prosein, 33 pounds of a 3% solution of a mixture of cetyl and octadecyl alcohols in castor oil, 38.5 pounds of calcium carbonate, and 15 pounds of a commercial liquefying diastase. The mixture was heated to about 70° C. and then to over 100° C. It was then cooled below 40° C. and thirty-five pounds of inoculum added. The inoculum was obtained from a starch culture of a strain of Bacillus mesentericus which had shown rapid liquefying action. This culture has been incubated for twenty-four hours at 37° C. before addition to the mixture. Air was passed into the mixture, the mixture was vigorously stirred, and the kettle was held under twenty-five pounds pressure. The rate of supply of filtered air was 1400 cubic feet per hour. At the end of twenty-four hours, the proteolytic activity was such that one part of culture medium converted 1300 times its weight of animal glue. At the end of forty-eight hours, one part of the culture medium converted 9090 times its weight of starch.

Example 6

A nutrient medium was prepared in a 100-gallon jacketed kettle equipped with an efficient stirrer, a tube for introducing gas, and a valve for venting gas under pressure. For this purpose, there were mixed four hundred pounds of water, twelve pounds of cotton seed meal containing 38% of protein and being mostly in a particle size of forty to eighty mesh, four pounds of casein, sixteen pounds of corn starch, and forty pounds of hominy in a twenty to eighty mesh size, with most of the particles passing a sixty-mesh screen. The pH of the mixture was adjusted to 6.5 by the addition of seventy-five milliliters of a 50% caustic solution and twenty-four ounces of calcium carbonate. A commercial diastase of high liquefying power was added in the amount of fifteen ounces and also two pounds of anti-foam agent consisting of a 5% cetyl alcohol solution in soya bean oil. The mixture was stirred and heated to 70° C., held at this temperature for fifteen minutes, and then heated at 120° C. for twenty-five minutes. Cooling water was then run through the jacket of the kettle and the temperature of the sterilized mixture rapidly reduced to 35° C. At that point, one liter of inoculum was injected. This inoculum had been prepared by growing Bacillus mesentericus on a mixture containing starch, bran, and 55% of water for twenty-four hours at 35° C., with this culture then being taken up in twelve hundred milliliters of water and one thousand milliliters of the fluid being decanted to provide the inoculum. Cleaned air was blown into the culture medium in the kettle at the rate of ninety cubic feet (N. T. P.) per hour. The kettle was maintained under twenty-five pounds' pressure and gases, including carbon dioxide, were taken off at this pressure. Stirring was performed at a relatively rapid rate to ensure uniform conditions throughout the whole nutrient medium. Through cooling, the growing culture was held at 35° to 38° C. Protease and diastase began to be formed in a short time, and their activities were determined at frequent intervals of time. After forty hours, the diastatic activity had reached a level at which one part of the medium liquefied nine thousand parts of starch under the prescribed conditions. At fifty hours, the proteolytic activity had reached a high level, twenty-two hundred parts of glue being liquefied by one part of medium under the conditions defined above.

By the method described, there may be obtained a culture liquid, one part of which will convert eight thousand to twelve thousand parts of starch or one part of which will convert six hundred to twenty-two hundred parts of glue under the conditions stated above. The greater part of such activities may be transferred to solid adsorbents or concentrated in a solid portion which is precipitable from the liquid. There is thus obtained an exceptionally favorable yield of enzymes for a given amount of nutrient materials. The process is economical as to time, apparatus, space, and labor.

We claim:

1. A method for producing proteolytic and amylolytic enzymes by submerged culture which comprises growing at temperatures of 30° to 40° C. and at a pH between six and nine enzyme-producing strains of bacteria selected from the class consisting of *Bacillus mesentericus* and *Bacillus subtilis* in an aqueous medium containing starch and protein and having dispersed therein discrete particles of broken cereal grain, supplying said medium with gaseous oxygen at a rate at least twice as great as the rate of consumption as shown by evolvement of carbon dioxide, sweeping out carbon dioxide, and mechanically agitating the aqueous medium to maintain practically uniform conditions throughout said medium.

2. A method for producing proteolytic and amylolytic enzymes by submerged culture which comprises cultivating at 30° to about 40° C. enzyme-producing strains of bacteria selected from a member of the class consisting of *Bacillus mesentericus* and *Bacillus subtilis* in an aqueous medium having a pH between six and nine and containing two to fourteen parts of solubilized starch, one to five parts of protein, five to fifteen parts of broken cereal grain having particles from twenty to eighty mesh in size, and one hundred parts of water, supplying said medium with gaseous oxygen at the rate of at least 0.0019 gram per cubic centimeter of medium per hour, sweeping out carbon dioxide as it develops by flowing an excess of gaseous oxygen through the medium, and mechanically agitating the aqueous medium to maintain practically uniform conditions throughout said medium.

3. A method for producing proteolytic and amylolytic enzymes by submerged culture which comprises cultivating at 30° to about 40° C. enzyme-producing strains of *Bacillus mesentericus* in an aqueous medium having a pH between six and nine and containing two to fourteen parts of solubilized starch, one to five parts of protein, five to fifteen parts of broken cereal grain having particles from twenty to eighty mesh in size, and one hundred parts of water, supplying said medium with gaseous oxygen at the rate of at least 0.0019 gram per cubic centimeter of medium per hour, sweeping out carbon dioxide as it develops by flowing an excess of gaseous oxygen through the medium, and mechanically agitating the aqueous medium to maintain practically uniform conditions throughout said medium.

4. A method for producing proteolytic and amylolytic enzymes by submerged culture which comprises cultivating at 30° to about 40° C. enzyme-producing strains of *Bacillus subtilis* in an aqueous medium having a pH between six and nine and containing two to fourteen parts of solubilized starch, one to five parts of protein, five to fifteen parts of broken cereal grain having particles from twenty to eighty mesh in size, and one hundred parts of water, supplying said medium with gaseous oxygen at the rate of at least 0.0019 gram per cubic centimeter of medium per hour, sweeping out carbon dioxide as it develops by flowing an excess of gaseous oxygen through the medium, and mechanically agitating the aqueous medium to maintain practically uniform conditions throughout said medium.

5. A method for producing proteolytic and amylolytic enzymes by submerged culture which comprises cultivating at 30° to about 40° C. and under five to forty pounds' pressure enzyme-producing strains of bacteria selected from a member of the class consisting of *Bacillus mesentericus* and *Bacillus subtilis* in an aqueous medium having a pH between six and nine and containing two to fourteen parts of solubilized starch, one to five parts of protein, five to fifteen parts of broken cereal grain having particles from twenty to eighty mesh in size, and one hundred parts of water, supplying said medium with gaseous oxygen at the rate of at least 0.0019 gram per cubic centimeter of medium per hour, sweeping out carbon dioxide as it develops by flowing an excess of gaseous oxygen through the medium, and mechanically agitating the aqueous medium to maintain practically uniform conditions throughout said medium.

6. A method for producing proteolytic and amylolytic enzymes by submerged culture which comprises cultivating at 30° to about 40° C. and under five to forty pounds' pressure enzyme-producing strains of *Bacillus mesentericus* in an aqueous medium having a pH between six and nine and containing two to fourteen parts of solubilized starch, one to five parts of protein, five to fifteen parts of broken cereal grain having particles from twenty to eighty mesh in size, and one hundred parts of water, supplying said medium with gaseous oxygen at the rate of at least 0.0019 gram per cubic centimeter of medium per hour, sweeping out carbon dioxide as it develops by flowing an excess of gaseous oxygen through the medium, and mechanically agitating the aqueous medium to maintain practically uniform conditions throughout said medium.

7. A method for producing proteolytic and amylolytic enzymes by submerged culture which comprises cultivating at 30° to about 40° C. and under five to forty pounds' pressure enzyme-producing strains of *Bacillus subtilis* in an aqueous medium having a pH between six and nine and containing two to fourteen parts of solubilized starch, one to five parts of protein, five to fifteen parts of broken cereal grain having particles from twenty to eighty mesh in size, and one hundred parts of water, supplying said medium with gaseous oxygen at the rate of at least 0.0019 gram per cubic centimeter of medium per hour, sweeping out carbon dioxide as it develops by flowing an excess of gaseous oxygen through the medium, and mechanically agitating the aqueous medium to maintain practically uniform conditions throughout said medium.

CARL V. SMYTHE.
BILLY BLANDIN DRAKE.
CLIFFORD E. NEUBECK.

REFERENCES CITED

The following references are of record in the file of this patent:

UNITED STATES PATENTS

| Number | Name | Date |
|---|---|---|
| 2,098,962 | Hellbach | Nov. 16, 1937 |
| 2,302,079 | Waldman | Nov. 17, 1942 |
| 2,440,357 | Behrens | Apr. 27, 1948 |

OTHER REFERENCES

Jour. Bact., November 1938, pages 521 to 523, by Berger et al.

Jr. Bact., volume 52, pages 227-8 (1946 by Stockton et al.).